(12) United States Patent  
Kuwayama et al.

(10) Patent No.: US 10,144,265 B2  
(45) Date of Patent: Dec. 4, 2018

(54) AIR CONDITIONING UNIT FOR VEHICLE

(71) Applicant: DENSO CORPORATION, Kariya, Aichi-pref. (JP)

(72) Inventors: Akinori Kuwayama, Kariya (JP); Shinichirou Hirai, Kariya (JP); Yasuhiro Sekito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 221 days.

(21) Appl. No.: 15/030,342

(22) PCT Filed: Oct. 9, 2014

(86) PCT No.: PCT/JP2014/005139  
§ 371 (c)(1),  
(2) Date: Apr. 18, 2016

(87) PCT Pub. No.: WO2015/059885  
PCT Pub. Date: Apr. 30, 2015

(65) Prior Publication Data  
US 2016/0236535 A1 Aug. 18, 2016

(30) Foreign Application Priority Data  
Oct. 21, 2013 (JP) ................................. 2013-218406

(51) Int. Cl.  
*B60H 1/12* (2006.01)  
*B60H 1/00* (2006.01)

(52) U.S. Cl.  
CPC ..... *B60H 1/00064* (2013.01); *B60H 1/00028* (2013.01); *B60H 1/00671* (2013.01);  
(Continued)

(58) Field of Classification Search  
CPC ............ B60H 1/00664; B60H 1/00671; B60H 1/00678; B60H 1/12; B60H 2001/00714; B60H 2001/00135; B60H 2001/00121  
See application file for complete search history.

(56) References Cited

U.S. PATENT DOCUMENTS 6,206,092 B1 * 3/2001 Beck .................. B60H 1/00064  
                                                         165/203  
2001/0001417 A1 5/2001 Beck et al.  
(Continued)

FOREIGN PATENT DOCUMENTS

DE 19955616 C1 * 11/2000 ......... B60H 1/00064  
FR 3010660 A1 * 3/2015 ......... B60H 1/00064  
(Continued)

*Primary Examiner* — Devon Russell  
(74) *Attorney, Agent, or Firm* — Harness, Dickey & Pierce, P.L.C.

(57) ABSTRACT

An air conditioning unit for a vehicle has a casing, a heating heat exchanger, a first partition plate, a first opening, a second partition plate, a second opening, and a switching door. The casing has a face opening and a foot opening. The heating heat exchanger is arranged in the casing. The first partition plate partitions a downstream side of the heating heat exchanger in an airflow direction into a first passage and a second passage located below the first passage. The first opening is formed on a downstream side of the first partition plate in an airflow direction and communicates between the first passage and the second passage. The second partition plate is arranged on the downstream side of the heating heat exchanger and is formed with a third passage between the first partition plate and the second partition plate in the first passage. The second opening that is located on a downstream side of the second partition plate in an airflow direction and communicates between an upper side and a lower side of the second partition plate. The switching door opens or closes the first and second openings. The air in the (Continued)

<BI-LEVEL MODE> third passage is guided toward the foot opening by the second partition plate and the switching door in an air conditioning mode in which the switching door opens the first opening and closes the second opening.

12 Claims, 15 Drawing Sheets

(52) U.S. Cl.
CPC ..... *B60H 1/00678* (2013.01); *B60H 1/00692* (2013.01); *B60H 1/12* (2013.01); *B60H 2001/00121* (2013.01); *B60H 2001/00135* (2013.01); *B60H 2001/00164* (2013.01); *B60H 2001/00185* (2013.01); *B60H 2001/00714* (2013.01); *B60H 2001/00721* (2013.01)

(56) References Cited

U.S. PATENT DOCUMENTS

| | | | | |
|---|---|---|---|---|
| 2008/0200110 | A1* | 8/2008 | Ghosh | B60H 1/00671 |
| | | | | 454/160 |
| 2009/0117841 | A1* | 5/2009 | Goto | B60H 1/00064 |
| | | | | 454/127 |

FOREIGN PATENT DOCUMENTS

| | | | | |
|---|---|---|---|---|
| JP | H09156348 A | | 6/1997 | |
| JP | H10138735 A | | 5/1998 | |
| JP | 10181331 A | * | 7/1998 | ......... B60H 1/00064 |
| JP | H10181331 A | | 7/1998 | |
| JP | H10329525 A | | 12/1998 | |
| JP | H11245652 A | | 9/1999 | |
| JP | 2009113538 A | | 5/2009 | |
| WO | WO 2016142115 A1 | * | 9/2016 | ......... B60H 1/00064 |

* cited by examiner

<BI-LEVEL MODE>

<FOOT MODE>

<FACE MODE>

FIG. 6A <BI-LEVEL MODE>
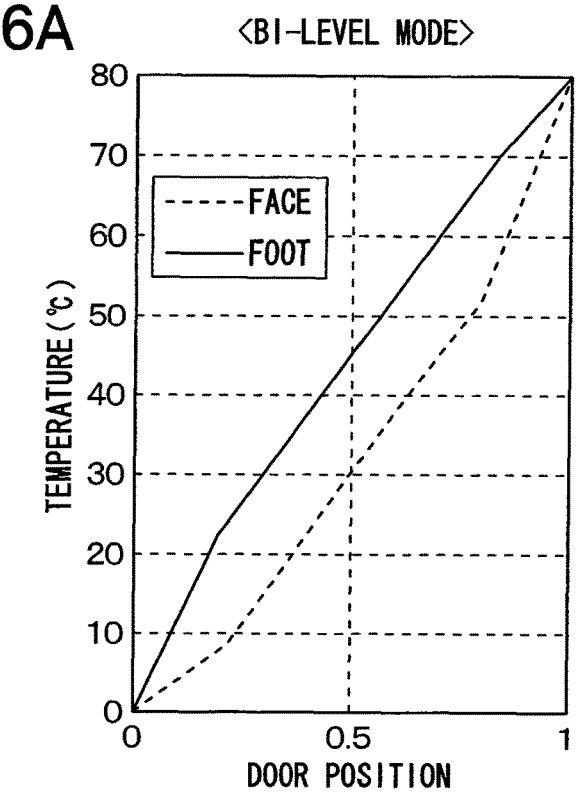
FIG. 6B <FOOT MODE>
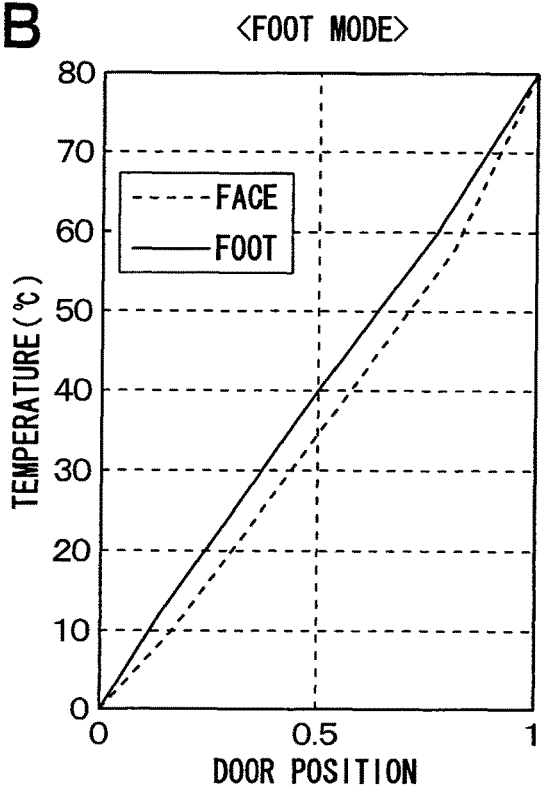

AIR CONDITIONING UNIT FOR VEHICLE

CROSS REFERENCE TO RELATED APPLICATIONS

This application is a U.S. National Phase Application under 35 U.S.C. 371 of International Application No. PCT/JP2014/005139 filed on Oct. 9, 2014 and published in Japanese as WO 2015/059885 A1 on Apr. 30, 2015. This application is based on and claims the benefit of priority from Japanese Patent Application No. 2013-218406 filed on Oct. 21, 2013. The entire disclosures of all of the above applications are incorporated herein by reference.

TECHNICAL FIELD

The present disclosure relates to an air conditioning unit for a vehicle.

BACKGROUND ART

Conventionally, an air conditioning unit for a vehicle that includes: a casing that has a partitioning plate for partitioning an upper air passage and a lower air passage; an evaporator that is arranged across the upper air passage and the lower air passage; and a heater unit that is arranged across the upper air passage and the lower air passage and heats cool air blown from the evaporator has been available (for example, see Patent Literature 1 and Patent Literature 2).

In the casing, the partitioning plate on a downstream side in an air flow direction of the heater unit is provided with an opening that communicates between the upper air passage and the lower air passage and a switching door for opening or closing the opening.

Thus, in a foot mode, conditioned air is blown from a foot opening and a face opening in a state that the opening is closed by the switching door. In a bi-level mode, the conditioned air is blown from the foot opening and the face opening in a state that the opening is opened by the switching door. That is, in the bi-level mode, in order to increase a temperature difference between a temperature of the air blown from the foot opening and a temperature of the air blown from the face opening in comparison with that in the foot mode, warm air flows from the upper air passage to the lower air passage through the opening.

PRIOR ART LITERATURES

Patent Literature

Patent Literature 1: JP H09-156348 A
Patent Literature 2: JP H10-181331 A

SUMMARY OF INVENTION

From the consideration of the air conditioning unit for a vehicle in Patent Literatures 1 and 2 by the subject inventor, pressure difference is not produced between the upper air passage and the lower air passage on the downstream side of the heater unit in the casing. Furthermore, even when the opening is opened by the switching door, a sufficient volume of the warm air does not flow into the lower air passage from the upper air passage through the opening.

Accordingly, the temperature difference between the temperature of the air blown from the foot opening and the temperature of the air blown from the face opening in the bi-level mode is the same as the temperature difference between the temperature of the air blown from the foot opening and the temperature of the air blown from the face opening in the foot mode.

In view of the above point, it is an objective of the present disclosure to provide an air conditioning unit for a vehicle in which warm air from an upper air passage reliably flows into a foot opening through an opening.

An air conditioning unit for a vehicle of the present disclosure has a casing, a heating heat exchanger, a first partition plate, a first opening, a second partition plate, a second opening, and a switching door. The casing has a face opening and a foot opening provided below the face opening in an upper-lower direction and is formed with a passage through which air flows toward the face opening and the foot opening. The heating heat exchanger is arranged in the casing and heats the air. The first partition plate is located below the face opening and partitions a downstream side in an airflow direction of the heating heat exchanger into a first passage and a second passage located below the first passage. The first opening is formed on a downstream side of the first partition plate in an airflow direction and communicates between the first passage and the second passage. The second partition plate is arranged above the first partition plate on the downstream side of the heating heat exchanger and is formed with a third passage between the first partition plate and the second partition plate in the first passage. The second opening is located on a downstream side of the second partition plate in an airflow direction and communicates between an upper side and a lower side of the second partition plate. The switching door opens or closes the first and second openings.

The foot opening is located below an opening forming section of the first partition plate that forms the first opening. The air in the third passage flows toward the face opening in a first air conditioning mode in which the switching door closes the first opening and opens the second opening. The air in the third passage is guided toward the foot opening by the second partition plate and the switching door in a second air conditioning mode in which the switching door opens the first opening and closes the second opening.

In the second air conditioning mode, the warm air that is blown from the heating heat exchanger through a gap between the heating heat exchanger and the partition plate can flow to the foot opening side by the switching door. That is, the warm air from the first passage reliably flows into the foot opening through the opening. Thus, in the second air conditioning mode, a temperature difference between a temperature of the blown air at the face opening and a temperature of the blown air at the foot opening can be increased in comparison with the first air conditioning mode.

BRIEF DESCRIPTION OF DRAWINGS

FIG. 6A is a graph showing a relation between a temperature of blown air and an air-mix door position in the face mode according to the first embodiment.

FIG. 6B is a graph showing the relation between the temperature of the blown air and the air-mix door position in the foot mode according to the first embodiment.

DESCRIPTION OF EMBODIMENTS

Figure 1:
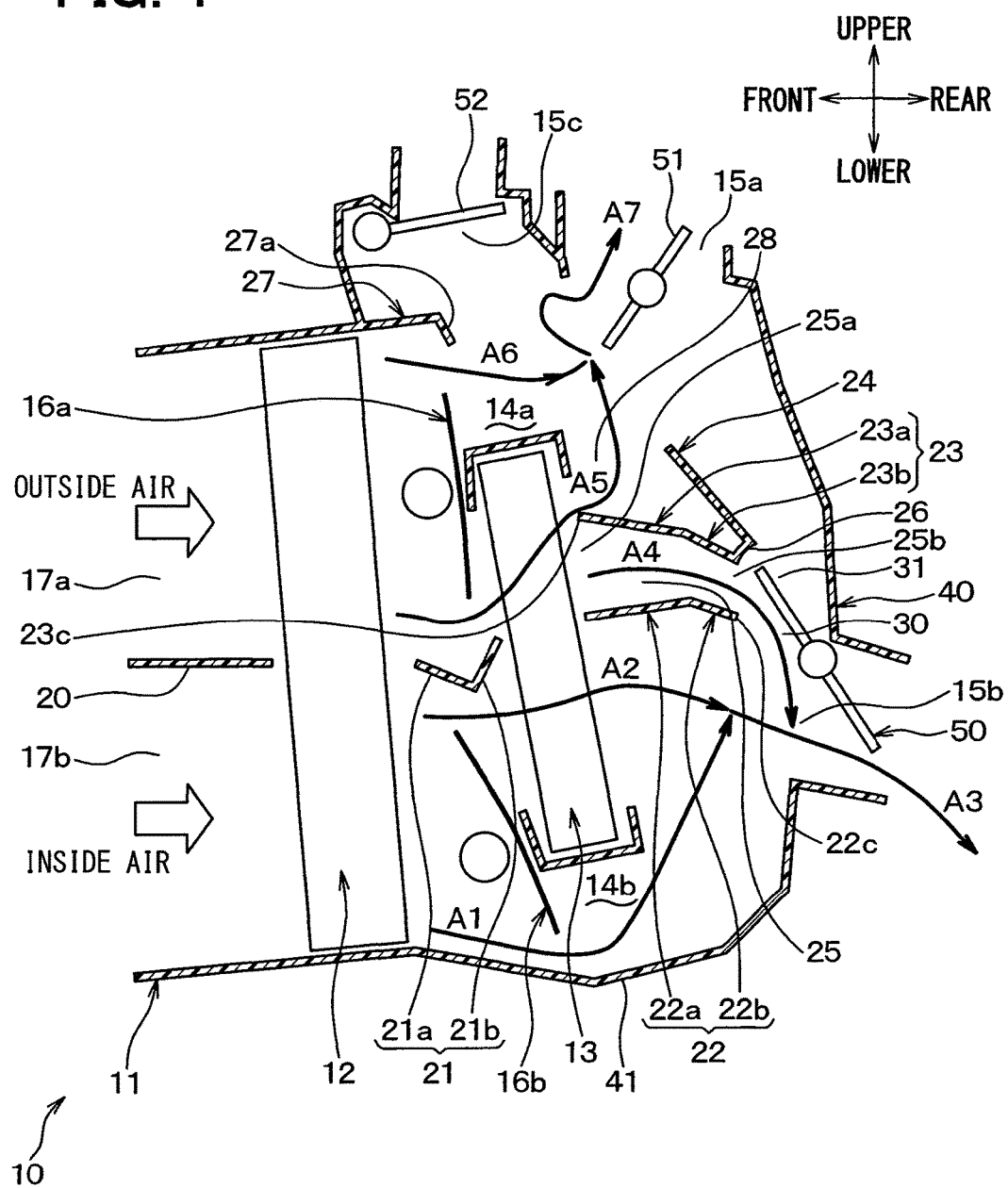
FIG. 1 is a cross-sectional view illustrating an air conditioning unit in an air conditioning unit for a vehicle in a bi-level mode according to a first embodiment.

A description will hereinafter be made on embodiments of the present disclosure on the basis of the drawings. It should be noted that, in each of the following embodiments, components that are mutually the same or equivalent are denoted by the same reference signs in the drawings for a purpose of simplification of the description.

First Embodiment

FIG. 1 is a cross-sectional view illustrating an air conditioning unit 10 in an air conditioning unit for a vehicle in a first embodiment and depicts a state in a bi-level mode. In FIG. 1, upper, lower, front, and rear indicated by arrows are a direction on a condition where the air conditioning unit for a vehicle is mounted in a vehicle.

A ventilation system of the air conditioning unit for a vehicle of this embodiment is mainly divided into two parts of the air conditioning unit 10 and a blower unit, which is not shown. The blower unit is arranged in a manner being offset to a passenger seat side from a central section in a lower section of an instrument panel in a vehicle cabin. Meanwhile, the air conditioning unit 10 is arranged in the substantially central section in a right-left direction of the vehicle in the lower section of the instrument panel in the vehicle cabin.

The blower unit includes an inside/outside air introduction case that is formed by partitioning an outside-air ventilation passage (i.e., an upper air passage) and an inside-air ventilation passage (i.e., a lower air passage) by a partition wall. The inside/outside air introduction case includes: an outside air introduction port for introducing outside air (i.e., the outside air outside the vehicle cabin) into the outside-air ventilation passage; an inside air introduction port for introducing inside air (i.e., the air in the vehicle cabin) into the inside-air ventilation passage; and an inside/outside air switching door for opening at least one of the outside air introduction port and the inside air introduction port. On the outside-air ventilation passage side in the inside/outside air introduction case, a first centrifugal multi-blade fan that introduces the outside air from the outside air introduction port or the inside air from the inside air introduction port so as to blow the air to the upper air passage of the air conditioning unit 10 is arranged. Thus, either the outside air or the inside air is introduced to the outside-air ventilation passage side of the blower unit. Hereinafter, the upper air passage of the air conditioning unit 10 is referred to as an outside air passage (i.e., a first passage).

The inside air introduction port for introducing the inside air into the inside-air ventilation passage is provided in the blower unit. On the inside-air ventilation passage side in the inside/outside air introduction case, a second centrifugal multi-blade fan that introduces the inside air from the inside air introduction port so as to blow the air into the lower air passage of the air conditioning unit 10 is arranged. Thus, the inside air is introduced to the inside-air ventilation passage side of the blower unit. Hereinafter, the lower air passage of the air conditioning unit 10 is referred to as an inside air passage (i.e., a second passage).

The first and second centrifugal multi-blade fans (i.e., sirocco fans) of this embodiment constitute a blower together with an electric motor for driving the first and second centrifugal multi-blade fans.

In addition, the air conditioning unit 10 constitutes an air conditioning unit for a vehicle and is arranged in a mode shown in FIG. 1 with respect to a front-rear direction of the vehicle and an upper-lower direction of the vehicle in the substantially central section in the lower section of the instrument panel in the vehicle cabin. The air conditioning unit 10 includes an evaporator (i.e., a cooling heat exchanger) 12 and a heater core (i.e., a heating heat exchanger) 13 in a casing 11.

As shown in FIG. 1, the evaporator 12 is in a flat shape in which a length in the front-rear direction is shorter than a length in the upper-lower direction and in which a longitudinal length extends in the right-left direction and the upper-lower direction. The evaporator 12 is arranged across the outside air passage and the inside air passage in the casing 11. As well known, the evaporator 12 absorbs evaporation latent heat of a refrigerant in a refrigeration cycle from the air and cools the air.

The heater core 13 is arranged across the outside air passage and the inside air passage in the casing 11 on a downstream side of the evaporator 12 in an airflow direction. The heater core 13 is in a flat shape in which a length in the front-rear direction is shorter than a length in the upper-lower direction and in which a longitudinal length extends in the right-left direction. The heater core 13 is arranged obliquely to the upper-lower direction such that a lower end thereof is positioned in front than an upper end thereof. The heater core 13 heats the cool air passing through the evaporator 12 again. A high-temperature engine coolant (i.e., a warm coolant) flows through the inside of the heater core 13, and the heater core 13 heats the air by using the engine coolant as a heat source.

A bypass passage 14a is provided on an upper side of the heater core 13 in the outside air passage of the air conditioning unit 10. The bypass passage 14a lets the cool air that flows out from the evaporator 12 bypass the heater core 13 and flow toward a face opening 15a.

In the outside air passage, an air-mix door 16a is provided on an upstream side of the bypass passage 14a and the heater core 13 in the airflow direction. As the air-mix door 16a of this embodiment, a slide door that is slid and moved by an electric motor is used. In the outside air passage, the air-mix door 16a changes a ratio of an air volume that passes through the bypass passage 14a and an air volume that passes through the heater core 13 by slide movement.

A bypass passage 14b is provided on a lower side of the heater core 13 in the inside air passage of the air conditioning unit 10. The bypass passage 14b is a passage that lets the cool air that flows out from the evaporator 12 bypass the heater core 13 and flow toward a foot opening 15b.

As an air-mix door 16b of this embodiment, a slide door that is slid and moved by an electric motor is used. In the inside air passage, the air-mix door 16b changes a ratio of an air volume that passes through the bypass passage 14b and an air volume that passes through the heater core 13 by slide movement.

The casing 11 forms the air passages through which the air flows toward the inside of the vehicle cabin. The casing 11 is formed of a molded article made of a resin, such as polypropylene, that has a certain degree of elasticity and superior strength.

On a front side in the casing 11, an outside air inflow port (i.e., an upper air inflow port) 17a and an inside air inflow port (i.e., a lower air inflow port) 17b are provided. The outside air inflow port 17a introduces the outside air that is blown from the above-described blower unit into the outside air passage, which will be described below. The inside air inflow port 17b introduces the inside air that is blown from the above-described blower unit into the inside air passage, which will be described below. It should be noted that hereinafter the outside air inflow port 17a and the inside air inflow port 17b will also collectively be described as air inflow ports 17a, 17b.

Partition plates 20, 21, 22 are provided in the casing 11. The partition plates 20, 21, 22 each divides the inside of the casing 11 into the outside air passage and the inside air passage.

The partition plate 20 is arranged on the upstream side of the evaporator 12 and partitions the outside air inflow port 17a and the inside air inflow port 17b. The partition plate 21 is arranged between the evaporator 12 and the heater core 13 in an airflow direction.

The partition plate 21 includes plate sections 21a, 21b and is formed in an L shape when seen from the right-left direction. More specifically, the plate section 21a is inclined with respect to a lower side toward a rear side. In this way, the plate section 21a constitutes a cool air guide that guides the air, which passes through the evaporator 12, downward in the inside air passage. The plate section 21b is arranged on a rear side of the plate section 21a and crosses the plate section 21a at right angle. That is, the plate section 21b is projected obliquely upward from the plate section 21a. The plate section 21b constitutes a cool air guide that guides the air, which passes through the evaporator 12, upward in the outside air passage.

The partition plate 22 (i.e., a first partition plate) is a double-layered partition plate and is arranged on the downstream side of the heater core 13. The partition plate 22 partitions the outside air passage and the inside air passage that is located below the outside air passage in the casing 11, and includes plate sections 22a, 22b. The plate section 22a is formed in a plate shape that expands in the right-left direction, and is inclined upward as advancing to the rear side. The plate section 22b is formed in a plate shape that expands in the right-left direction on a rear side of the plate section 22a, and is inclined downward as advancing to the rear side.

An opening (i.e., a first opening) 30 is formed on a rear side of the partition plate 22 in the casing 11. The opening 30 is located between the partition plate 22 and a rear wall 40 of the casing 11 and communicates between the outside air passage and the inside air passage. The rear wall 40 of the casing 11 is formed on an upper side of the foot opening 15b, which will be described below.

A partition plate 23 (i.e., a second partition plate) formed in a plate shape that expands in the right-left direction is provided on an upper side of the partition plate 22 in the casing 11. The partition plate 23 further divides the outside air passage into an upper side and a lower side on the downstream side of the heater core 13.

More specifically, the partition plate 22 and the partition plate 23 constitute a warm air passage (i.e., a third passage) 25 through which warm air blown from the heater core 13 flows to the rear in the outside air passage. The partition plates 22, 23 are configured such that an opening area of a warm air inlet 25a of the warm air passage 25 becomes larger than an opening area of a warm air outlet 25b of the warm air passage 25.

More specifically, an upstream side (i.e., a front side) of the partition plate 23 in an airflow direction is located on an upper side of a downstream side (i.e., a rear side) of the partition plate 23 in the airflow direction. The partition plate 23 includes plate sections 23a, 23b that are formed in plate shapes. The plate section 23a is inclined downward toward the rear side. The plate section 23b is arranged on a rear side of the plate section 23a and is inclined downward as advancing to the rear side. An inclination angle of the plate section 23a is larger than an inclination angle of the plate section 23b. The inclination angle refers to an angle that is defined by each of the plate sections 23a, 23b in a clockwise direction with respect to the front-rear direction.

The plate sections 23a, 23b of the partition plate 23 are arranged to gradually reduce a cross-sectional area of the warm air passage 25 as advancing to the rear side. The plate sections 23a, 23b of the partition plate 23 guide the warm air passing through the plate sections 23a, 23b downward (i.e., toward the foot opening 15b side).

A guide plate 24 is provided on an upper side of the partition plate 23 in the casing 11. The guide plate 24 is formed in a plate shape that expands in the right-left direction and extends upward and forward from a rear side of the partition plate 23. That is, the guide plate 24 is arranged to be inclined forward with respect to the upper-lower direction. The guide plate 24 guides the warm air that is blown from the warm air outlet 25b of the warm air passage 25 toward the face opening 15a.

Figure 2:
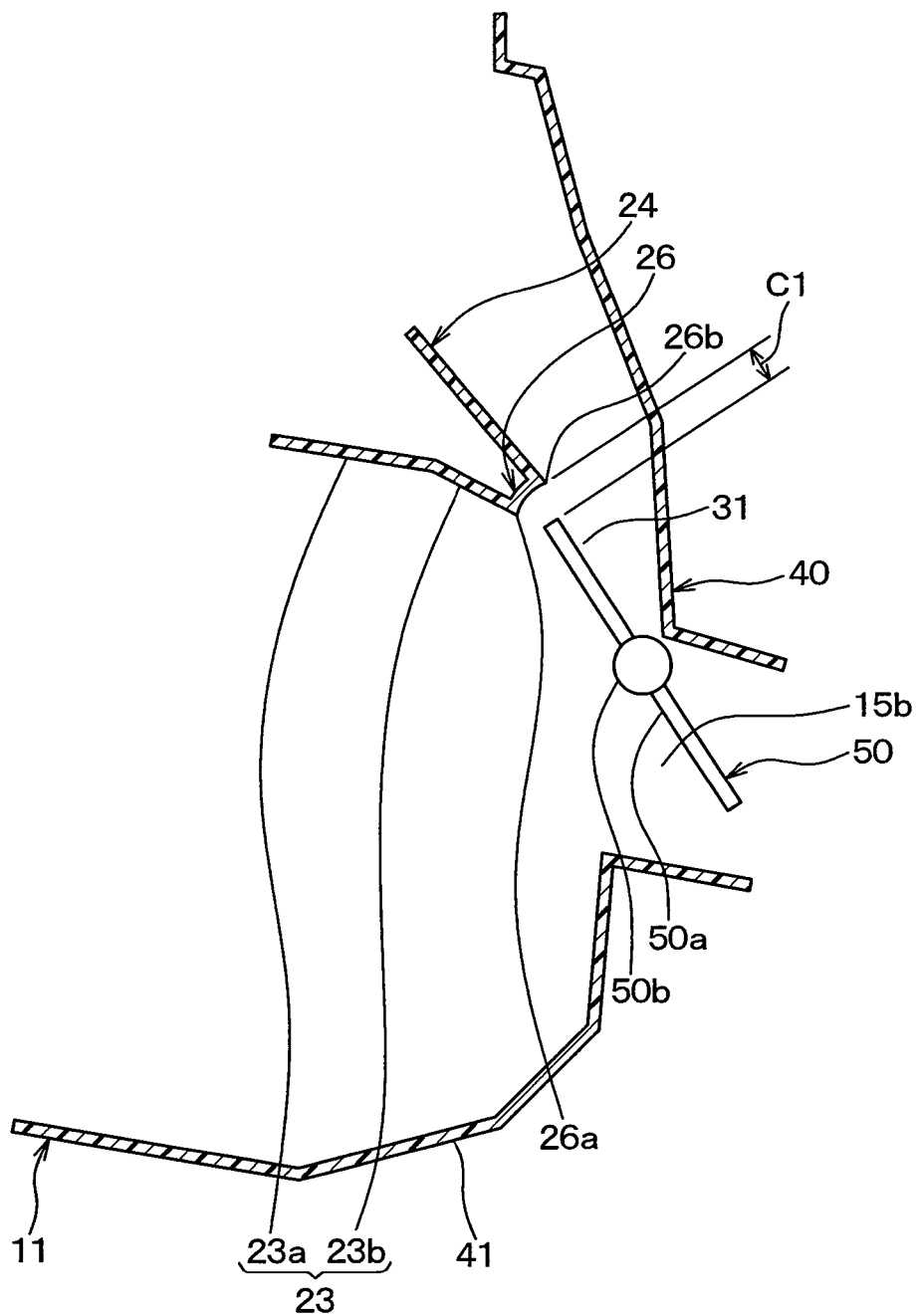
FIG. 2 is a partial cross-sectional view illustrating a mode door and a periphery thereof in FIG. 1.

An opening-end forming portion 26 is provided between the rear side of the partition plate 23 and a rear side of the guide plate 24 in the casing 11. The opening-end forming portion 26 forms an opening (i.e., a second opening) 31 between the opening-end forming portion 26 and the rear wall 40. In other words, the opening-end forming portion 26 is provided between an end on the opening 31 side of the partition plate 23 and the guide plate 24, so as to form the opening 31. The opening-end forming portion 26 is formed in an arc shape that is projected forward and upward (see FIG. 2). The opening-end forming portion 26 has a first end 26a on the partition plate 23 side and a second end 26b on the guide plate 24 side. A door body 50a of a mode door (a switching door) 50 rotates between the first end 26a and the second end 26b in a state that the opening 30 is opened while the opening 31 is closed (see FIG. 2). As shown in FIG. 2, when the door body 50a moves between the first end 26a and the second end 26b in conjunction with rotation of the mode door 50, clearance C1 between the opening-end forming portion 26 and the door body 50a is fixed.

A plate door is used as the mode door 50 of this embodiment. More specifically, the mode door 50 of this embodiment is a so-called "butterfly door" in which a rotational shaft 50b is arranged in a central section of the door body 50a formed in the plate shape. It should be noted that the mode door 50 is not limited to the butterfly door but a so-called "cantilevered door" in which a rotational shaft is provided on an end side of a plate-shaped door body (i.e., a plate door body) may be used.

Figure 3:
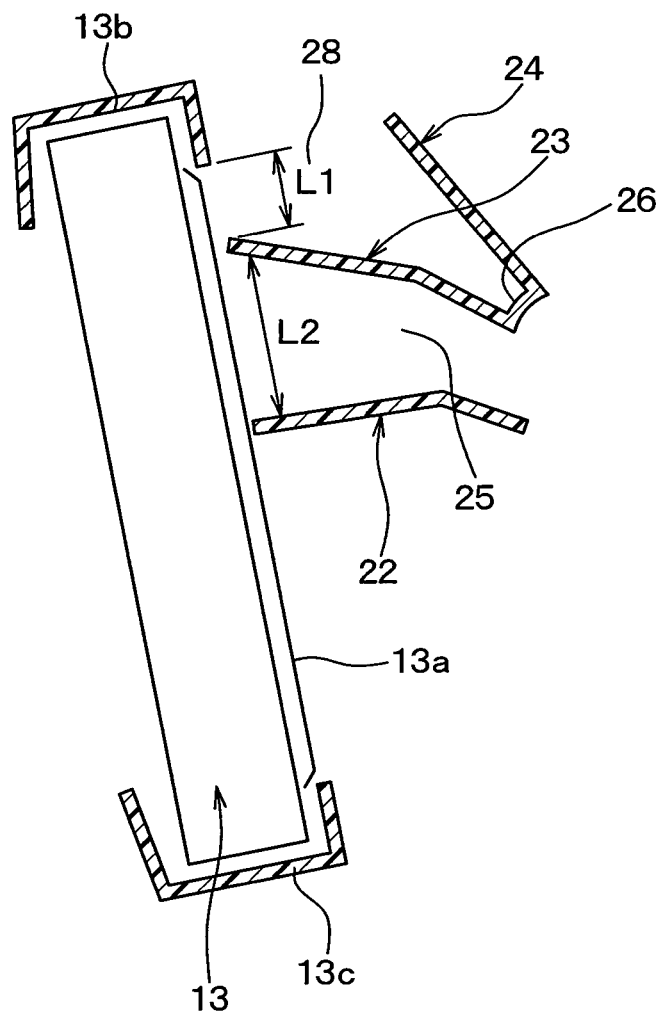
FIG. 3 is a partial cross-sectional view illustrating a heater core, a partitioning plate, and a guide plate in FIG. 1.

As shown in FIG. 3, a distance L2 of an air outflow surface 13a of the heater core 13 between the partition plate 22 and the partition plate 23 is longer than a distance L1 of the air outflow surface 13a of the heater core 13 between an upper side thereof and the partition plate 23. In other words, the distance L2 between the partition plate 22 and the partition plate 23 is longer than the distance L1 between an upper end of the air outflow surface 13a and the partition plate 23. The air outflow surface 13a is a surface through which the warm air is blown from the heater core 13.

More specifically, the air outflow surface 13a is a region in which portions covered with support members 13b, 13c (see FIG. 3) are removed from a surface on the downstream side of the heater core 13. The support members 13b, 13c are members that support the heater core 13 from the upper-lower direction.

Here, the partition plate 23, the opening-end forming portion 26, and the guide plate 24 overlap an upper region of the air outflow surface 13a of the heater core 13 in the upper-lower direction. A blowing outlet 28 from which the warm air passing through a portion of the heater core 13 on the upper side of the partition plate 23 is blown toward a defroster opening 15c is formed between an upper end of the guide plate 24 and the heater core 13. The warm air that is blown from the blowing outlet 28 is guided forward and upward by the guide plate 24.

The defroster opening 15c is provided on the upper side of the heater core 13 in the casing 11 in FIG. 1. The defroster opening 15c is opened on an upper side of the air conditioning unit 10. The defroster opening 15c communicates with a defroster blowing outlet through a duct. The defroster blowing outlet blows the conditioned air to an inner surface of a front window glass.

A mode door 52 that is supported by the casing 11 to be freely rotatable is provided on the upper side of the heater core 13 in the casing 11. The mode door 52 opens or closes the defroster opening 15c in conjunction with rotation thereof. The mode door 52 of this embodiment is the so-called "cantilevered door" in which the rotational shaft is provided on the end side of the plate-shaped door body.

Here, a cool air guide 27 is provided on an upper side of the air-mix door 16a in the casing 11. The cool air guide 27 is formed in a plate shape that extends to the rear from an upper end of the evaporator 12 and expands in the right-left direction. A rear side 27a of the cool air guide 27 is projected downward and rearward. In this way, the cool air that is blown from the evaporator 12 to the bypass passage 14a in the outside air passage is guided downward.

On the upper side of the heater core 13, the face opening 15a is provided on a rear side of the defroster opening 15c. The face opening 15a is opened to the upper side. The face opening 15a communicates with a face blowing outlet through a duct. The face blowing outlet blows the air-conditioned air toward an upper half body of an occupant on a front seat.

A mode door 51 that is supported by the casing 11 to be freely rotatable is provided on the upper sides of the partition plates 22, 23 in the casing 11. The mode door 51 opens or closes the face opening 15a in conjunction with rotation thereof. The mode door 51 of this embodiment is the so-called "butterfly door" in which the rotational shaft is provided in the central portion of the plate-shaped door body.

The foot opening 15b is provided on the rear side in the casing 11. The foot opening 15b is opened slightly downward. The foot opening 15b communicates with a foot blowing outlet through a duct. The foot opening 15b blows the conditioned air toward a lower half body of the occupant on the front seat. Here, the foot opening 15b is located on a lower side of an opening forming section 22c, which forms the opening 30, of the partition plate 22. The opening forming section 22c is located on the downstream side of the partition plate 22.

The mode door 50 that is supported by the casing 11 to be freely rotatable is provided at the rear of the partition plates 22, 23 in the casing 11. The mode door 50 closes any one of the openings 30, 31 and the foot opening 15b and opens the remaining two openings. It should be noted that the mode doors 50, 51, 52 of this embodiment are each connected to a servomotor via a link mechanism, which is not shown.

A lower wall 41 that is formed below the foot opening 15b in the casing 11 is provided on a lower side of the heater core 13. The rear wall 40 on the inside of the casing 11 is inclined forward as approaching from the foot opening 15b to the face opening 15a. In this way, the air passing through the opening 31 is guided toward the face opening 15a.

Next, an operation of this embodiment will be described.

First, the outside air flows into the outside air passage of the casing 11 from the blower unit through the outside air inflow port 17a. Then, the inside air flows into the inside air passage of the casing 11 from the blower unit through the inside air inflow port 17b. In this way, the outside air that flows through the outside air passage of the casing 11 is cooled by the evaporator 12. Thus, the cool air is blown from the evaporator 12 in the outside air passage. Then, the inside air that flows through the inside air passage of the casing 11 is cooled by the evaporator 12. Thus, the cool air is blown from the evaporator 12 in the inside air passage.

In this state, a face mode, the bi-level mode, or a foot mode is implemented by respectively driving the mode doors 50, 51, 52.

Hereinafter, the description will be made on the bi-level mode, the foot mode, and the face mode by referring to FIG. 1, FIG. 4, and FIG. 5, respectively.

(Bi-Level Mode)

As shown in FIG. 1, in the bi-level mode, the mode door 52 closes the defroster opening 15c, and the mode door 51 opens the face opening 15a. The mode door 50 closes the opening 31 and opens the opening 30 and the foot opening 15b.

Here, in the inside air passage, the cool air flowing out of the evaporator 12 and passing through the bypass passage 14b flows upward along the lower wall 41 as indicated by an arrow A1. In the inside air passage, the warm air flowing out of the evaporator 12 and blown from the heater core 13 is guided by the partition plate 22 and flows rearward and downward as indicated by an arrow A2. The warm air and the cool air are mixed, pass through the foot opening 15*b*, and are blown into the vehicle cabin as the conditioned air, as indicated by an arrow A3.

In the outside air passage, the warm air, which passes through the evaporator 12 and the heater core 13 and flows through the warm air passage 25 formed between the partition plates 22, 23, flows toward the foot opening 15*b* as indicated by an arrow A4. The warm air is guided into the foot opening 15*b* by the partition plate 23 and the mode door 50, is mixed with the above mixed air, and then is blown from the foot opening 15*b* as the conditioned air.

In the outside air passage, the warm air, which passes through the evaporator 12 and the heater core 13 and is blown from the upper side of the partition plate 23 through the blowing outlet 28, is guided by the guide plate 24 and flows on the upper side as indicated by an arrow A5.

In the outside air passage, the cool air flowing out of the evaporator 12 and passing through the bypass passage 14*b* flows rearward and slightly downward by the cool air guide 27 as indicated by an arrow A6. The cool air is mixed with the warm air that is guided by the partition plate 23 and flows above, passes through the face opening 15*a* as indicated by an arrow A7, and is blown into the vehicle cabin as the conditioned air.

As described above, in the bi-level mode, the conditioned air is blown from the face opening 15*a* and the foot opening 15*b*.

(Foot Mode)

Figure 4:
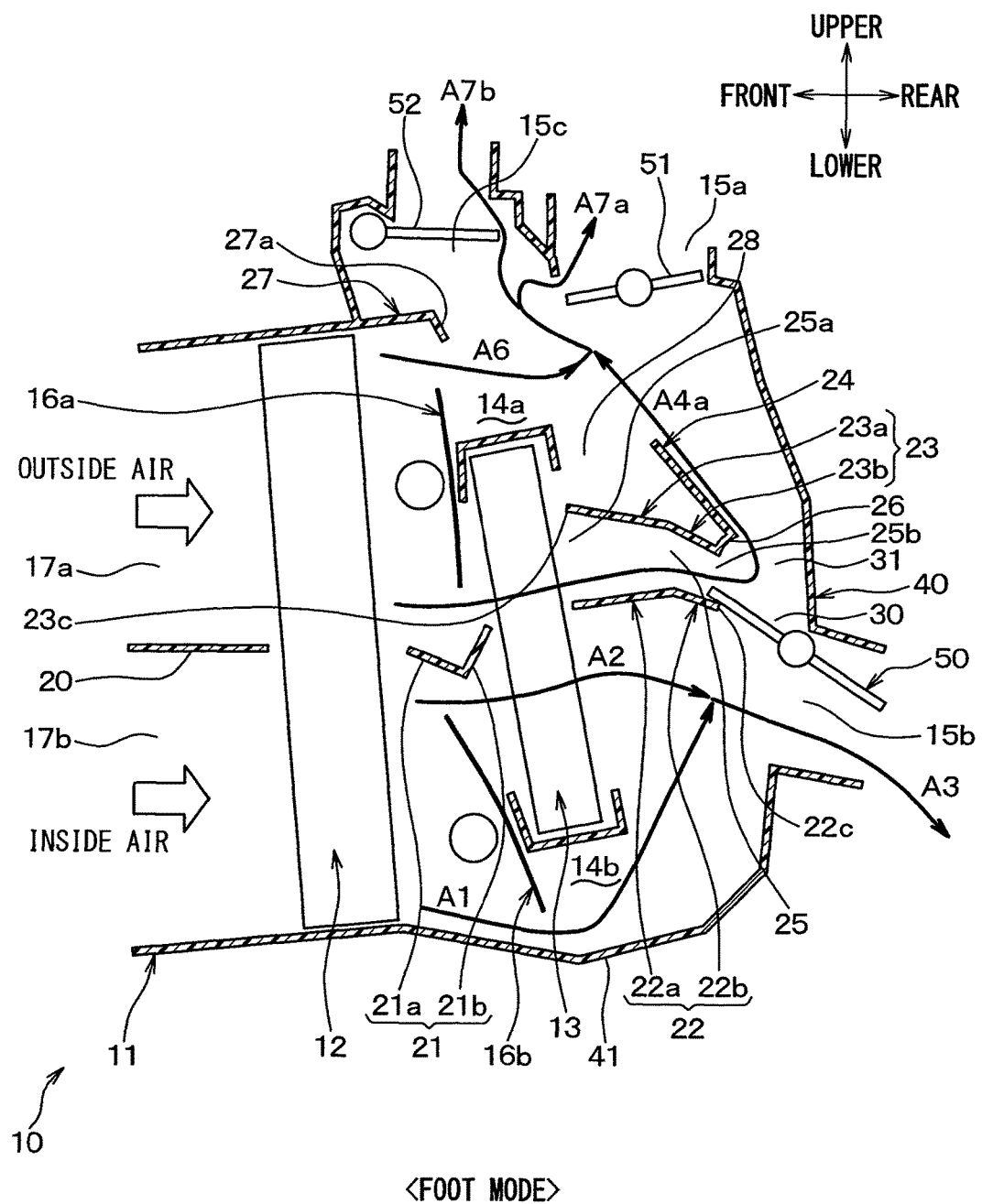
FIG. 4 is a cross-sectional view illustrating the air conditioning unit in a foot mode according to the first embodiment.

As shown in FIG. 4, in the foot mode, the mode door 52 slightly opens the defroster opening 15*c*, and the mode door 51 slightly opens the face opening 15*a*. The mode door 50 closes the opening 30 and opens the opening 31 and the foot opening 15*b*.

Here, the cool air that flows out from the evaporator 12, then passes through the bypass passage 14*b*, and flows as indicated by an arrow A1 and the warm air that passes through the evaporator 12 and the heater core 13, is guided by the partition plate 22, and flows as indicated by an arrow A2 are mixed and flows into the foot opening 15*b* as indicated by an arrow A3.

In the outside air passage, the warm air passing through the evaporator 12 and the heater core 13 flows through the warm air passage 25 that is formed between the partition plate 22 and the partition plate 23. The warm air is guided by the rear wall 40 and the guide plate 24 and, as indicated by an arrow A4*a*, flows toward the face opening 15*a* and the defroster opening 15*c*.

In the outside air passage, the cool air flowing out of the evaporator 12 and passing through the bypass passage 14*b* flows rearward and slightly downward by the cool air guide 27 as indicated by an arrow A6. The cool air and the warm air that is guided by the rear wall 40 and the guide plate 24 and flows on the upper side are mixed into the conditioned air. Some of the conditioned air flows into the face opening 15*a* as indicated by an arrow A7*a*. The rest of the conditioned air flows into the defroster opening 15*c* as indicated by an arrow A7*b*.

As described above, in the foot mode, the conditioned air is blown from the face opening 15*a*, the foot opening 15*b*, and the defroster opening 15*c*.

(Face Mode)

Figure 5:
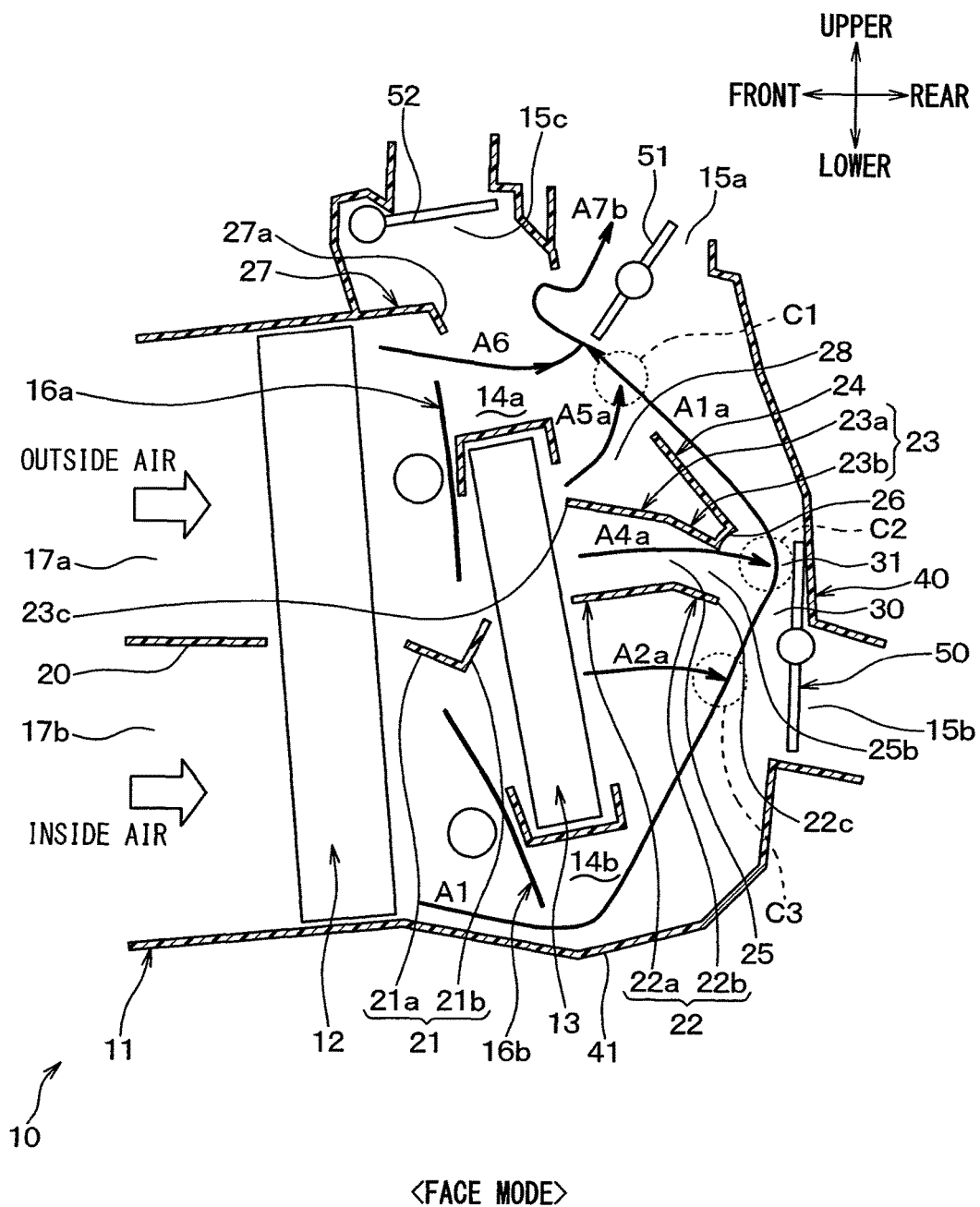
FIG. 5 is a cross-sectional view illustrating the air conditioning unit in a face mode according to the first embodiment.

As shown in FIG. 5, in the face mode, the mode door 52 closes the defroster opening 15*c*, and the mode door 51 opens the face opening 15*a*. The mode door 50 opens the openings 30, 31 and closes the foot opening 15*b*.

In the inside air passage, the cool air flowing out of the evaporator 12 and passing through the bypass passage 14*b* is guided by the lower wall 41, the rear wall 40, and the guide plate 24 and flows toward the face opening 15*a* as indicated by an arrow A1*a*.

In the inside air passage, the warm air that passes through the evaporator 12 and the heater core 13 and is blown from the heater core 13 as indicated by an arrow A2*a* joins the cool air.

In the outside air passage, the warm air, which passes through the evaporator 12 and the heater core 13 and flows through the inside of the warm air passage 25 as indicated by an arrow A4*a*, joins the cool air that flows as indicated by the arrow A1*a*. The warm air passing through the evaporator 12 and the heater core 13 and blown from the blowing outlet 28 is guided by the guide plate 24, flows upward as indicated by an arrow A5*a*, and joins the cool air that flows as indicated by the arrow A1*a*. Furthermore, in the outside air passage, the cool air flowing out of the evaporator 12 is guided by the cool air guide 27 after passing through the bypass passage 14*a* to flow as indicated by an arrow A6, and joins the cool air that flows as indicated by the arrow A1*a*.

As described above, in the face mode, the cool air and the warm air are joined and, as the conditioned air, flow toward the face opening 15*a*. In this way, the conditioned air is blown from the face opening 15*a* into the vehicle cabin.

As it has been described so far, according to this embodiment, the casing 11 has the face opening 15*a* and the foot opening 15*b* that is provided on the lower side of the face opening 15*a*. The casing 11 forms the passage through which the air flows toward the face opening 15*a* and the foot opening 15*b*. The heater core 13 is arranged in the casing 11 and heats the cool air from the evaporator 12. The partition plate 22 is arranged on the lower side of the face opening 15*a* in the casing 11 and divides the downstream side of the heater core 13 into the outside air passage and the inside air passage. In the casing, the opening 30 is arranged on the downstream side of the partition plate 22 and communicates between the upper side and the lower side of the partition plate 22. The foot opening 15*b* is arranged on the lower side of the opening forming section 22*c*, which forms the opening 30, of the partition plate 22. The partition plate 23 is arranged on the upper side of the partition plate 22 in the casing 11 and forms the warm air passage 25 between the partition plate 23 and the partition plate 22 on the downstream side of the heater core 13. The opening 31 is located on the downstream side of the partition plate 23 and communicates between the warm air passage 25 and the inside air passage.

In the foot mode (i.e., a first air conditioning mode) in which the mode door 50 closes the opening 30 and opens the opening 31, the warm air that flows through the warm air passage 25 is guided toward the face opening 15*a*. In the bi-level mode (i.e., a second air conditioning mode) in which the mode door 50 opens the opening 30 and closes the opening 31, the warm air that flows through the warm air passage 25 formed between the partition plate 22 and the partition plate 23 is guided into the foot opening 15*b* by the partition plate 23 and the mode door 50. Accordingly, by the mode door 50, a sufficient volume of the warm air flowing out of the heater core 13 can flow into the foot opening 15*b* from the outside air passage through the opening 30. In this way, in the bi-level mode, compared to the foot mode, a temperature difference between a temperature of the air blown from the face opening 15*a* and a temperature of the air blown from the foot opening 15*b* can be increased. Thus, a temperature of the air that is blown toward the upper half body can be lowered while a temperature of the air that is blown toward the lower half body can be increased. That is, a head can be kept cool while feet can be kept warm.

From what has been described so far, in the bi-level mode and the foot mode, controllability of the temperature difference between the temperature of the air blown from the face opening 15a and the temperature of the air blown from the foot opening 15b can be improved.

Hereinafter, regarding the controllability of the above temperature difference, the air conditioning unit 10 of this embodiment and an air conditioning unit 10A as a comparative example are compared.

FIGS. 6A, 6B are graphs showing relations between a temperature of the air blown into the vehicle cabin and positions of the air-mix doors 16a, 16b according to the air conditioning unit 10 of this embodiment. Chain lines show relations between the temperature of the air blown from the face opening 15a and the positions of the air-mix doors 16a, 16b. Solid lines show relations between the temperature of the air blown from the foot opening 15b and the positions of the air-mix doors 16a, 16b.

FIG. 6A shows the relation in the bi-level mode, and FIG. 6B shows the relation in the foot mode.

Figure 7A:
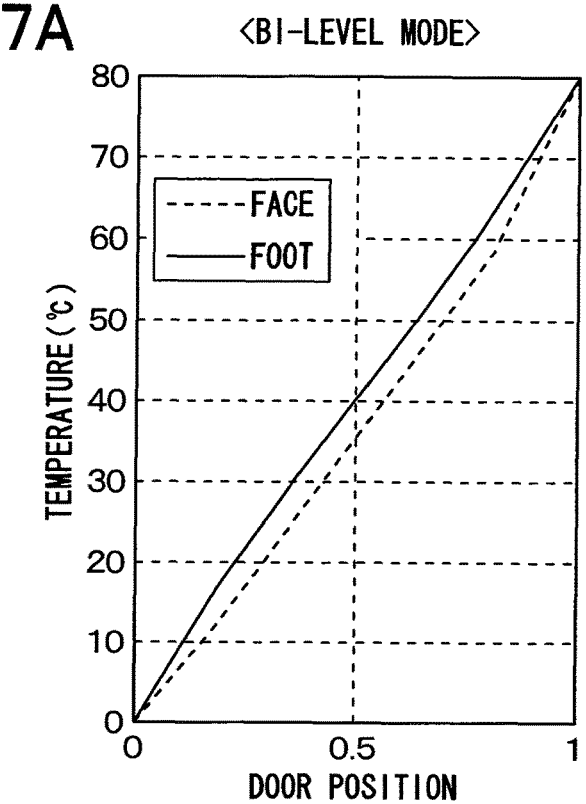
FIG. 7A is a graph showing a relation between a temperature of blown air and an air-mix door position in a face mode in a comparative example.
Figure 7B:
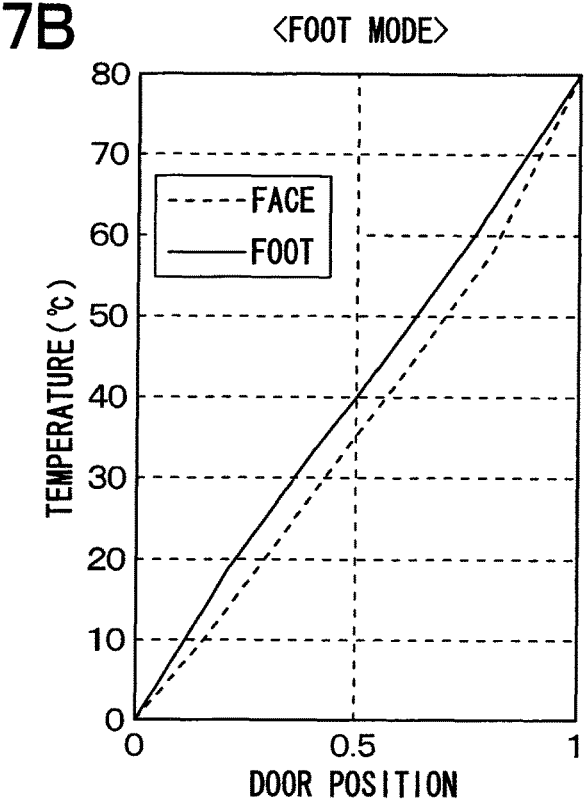
FIG. 7B is a graph showing the relation between the temperature of the blown air and the air-mix door position in a foot mode in the comparative example.

FIGS. 7A, 7B are graphs showing relations between the temperature of the air blown into the vehicle cabin and the positions of the air-mix doors 16a, 16b according to the air conditioning unit 10A as the comparative example. Chain lines show the relations between the temperature of the air blown from the face opening 15a and the positions of the air-mix doors 16a, 16b. Solid lines show the relations between the temperature of the air blown from the foot opening 15b and the positions of the air-mix doors 16a, 16b.

FIG. 7A shows the relation in the bi-level mode, and FIG. 7B shows the relation in the foot mode.

Figure 8:
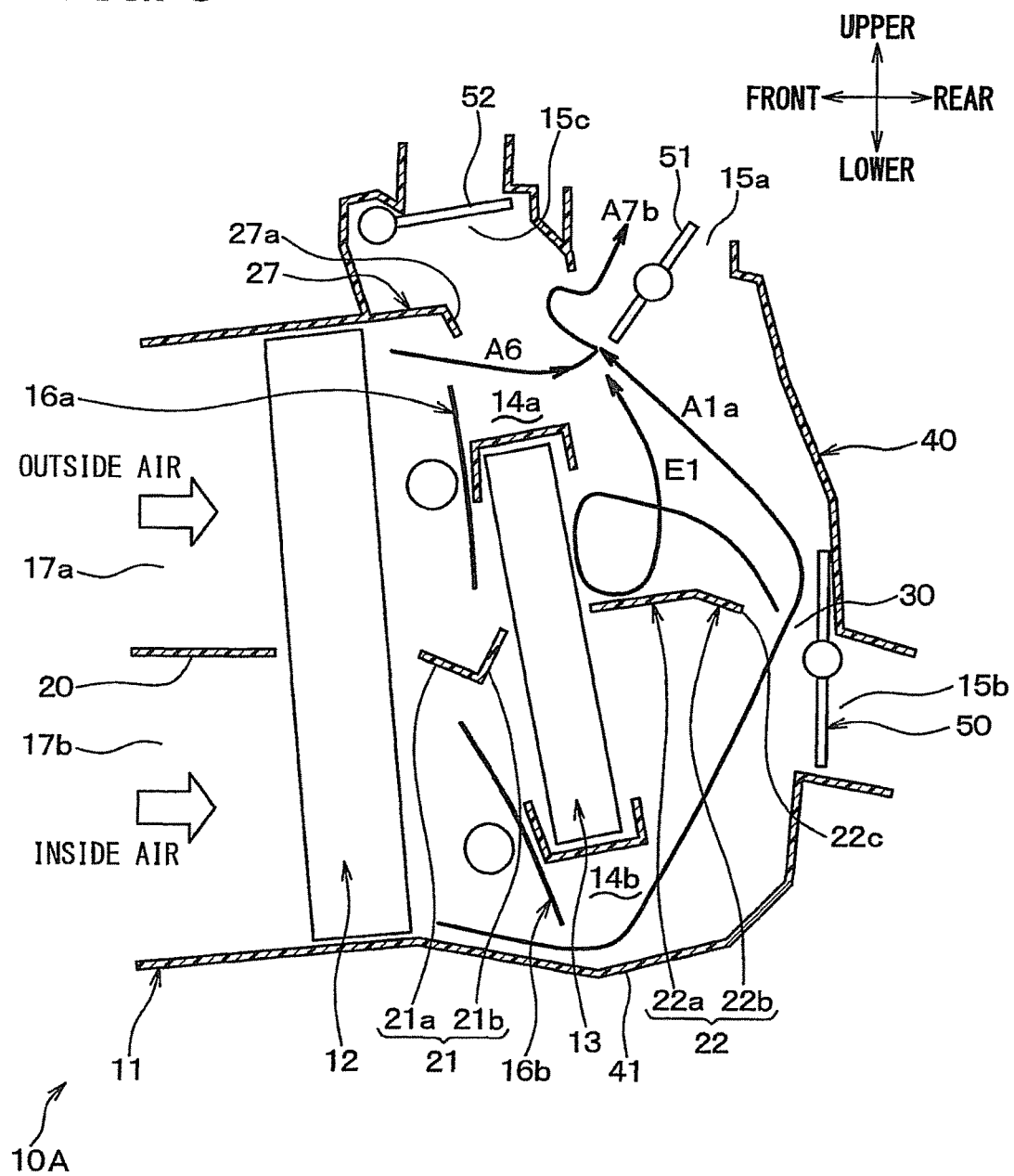
FIG. 8 is a cross-sectional view illustrating an air-conditioning unit in the comparative example.

As shown in FIG. 8, the air conditioning unit 10A as the comparative example is formed by removing the partition plate 23, the guide plate 24, and the opening-end forming portion 26 from the air conditioning unit 10 of this embodiment.

From the above description, it can be understood that, in the air conditioning unit 10, the temperature difference between the temperature of the air blown from the face opening 15a and the temperature of the air blown from the foot opening 15b is increased in the bi-level mode, compared to the air conditioning unit 10A.

As shown in FIG. 8, in the air conditioning unit 10A, the cool air passing through the bypass passage 14b in the inside air passage is guided by the lower wall 41 and the mode door 50 to flow upward and forward as shown by an arrow A1a. As indicated by an arrow E1, some of the cool air possibly flows toward the heater core 13 on the upper side of the partition plate 22 and is possibly heated again.

On the contrary, in this embodiment, the upper side of the partition wall 22 in the heater core 13, the partition plate 23, the guide plate 24, and the opening-end forming portion 26 overlap in the upper-lower direction. Accordingly, the cool air that flows from the bypass passage 14b is restricted from flowing toward the heater core 13 on the upper side of the partition plate 22.

In this embodiment, the partition plate 23 is formed such that the cross-sectional area of the warm air passage 25 is reduced as being distanced from the heater core 13 at a position between the partition plate 22 and the partition plate 23. Accordingly, a flow speed of the warm air that passes through the warm air passage 25aan be increased. Thus, the warm air that flows through the warm air passage 25aan reliably be guided into the foot opening 15b through the opening 30.

In this embodiment, the partition plate 23 is formed to approach the foot opening 15b as being distanced from the heater core 13. Thus, the warm air from the warm air passage 25aan further reliably flow into the foot opening 15b.

In this embodiment, the dimension L2 of the air outflow surface 13a of the heater core 13 between the partition plate 22 and the partition plate 23 is larger than the dimension L1 of the air outflow surface 13a between the upper side thereof and the partition plate 23. Accordingly, a volume of the warm air that passes through the air outflow surface 13a between the partition plate 22 and the partition plate 23 is larger than a volume of the warm air that passes through the air outflow surface 13a between the upper side thereof and the partition plate 23. Thus, a large volume of the warm air can flow from the warm air passage 25 into the foot opening 15b. Therefore, the temperature difference between the temperature of the air blown from the face opening 15a and the temperature of the air blown from the foot opening 15b can further be increased.

In this embodiment, the opening-end forming portion 26 has: the first end 26a that is connected to the partition plate 23; and the second end 26b that is connected to the guide plate 24. When the mode door 50 rotates and moves between the first end 26a and the second end 26b, the clearance between the door body 50a and the opening-end forming portion 26 is in the constant size. Accordingly, even in the case where the position of the door body 50a on the opening-end forming portion 26 side is changed between the first end 26a and the second end 26b in a state that the mode door 50 closes the opening 31, the clearance keeps the constant size, and thus a volume of the warm air that passes through a gap between the opening-end forming portion 26 and the mode door 50 is a constant volume. Therefore, the temperature difference between the temperature of the air blown from the face opening 15a and the temperature of the air blown from the foot opening 15b does not change.

In this embodiment, the guide plate 24 is inclined upward as advancing forward from the rear side. Accordingly, the warm air passing through the upper side of the partition plate 23 in the heater core 13 is guided to flow upward. Thus, the warm air can easily join the cool air that flows through the bypass passage 14a, and mixability of the warm air and the cool air can be improved.

In the face mode in FIG. 5, the cool air passing through the bypass passage 14b joins the warm air at three positions indicated by reference signs C1, C2, C3. Thus, the mixability of the cool air and the warm air can be improved.

It should be noted that C1 is a point at which the warm air blown from the blowing outlet 28 as indicated by the arrow A5a and the cool air are mixed. C2 is a point at which the warm air blown from the heater core 13 between the partition plates 22, 23 as indicated by the arrow A4a and the cool air are mixed. C3 is a point at which the warm air blown from the heater core 13 on the lower side of the partition plate 22 as indicated by the arrow A2a and the cool air are mixed.

Second Embodiment

In this second embodiment, a description will be made on an example in which, in the above first embodiment, the cool air passing through a bypass passage 14b is guided to bypass a mode door 50 and flow toward a face opening 15a in the state that the mode door 50 closes an opening 31.

Figure 9:
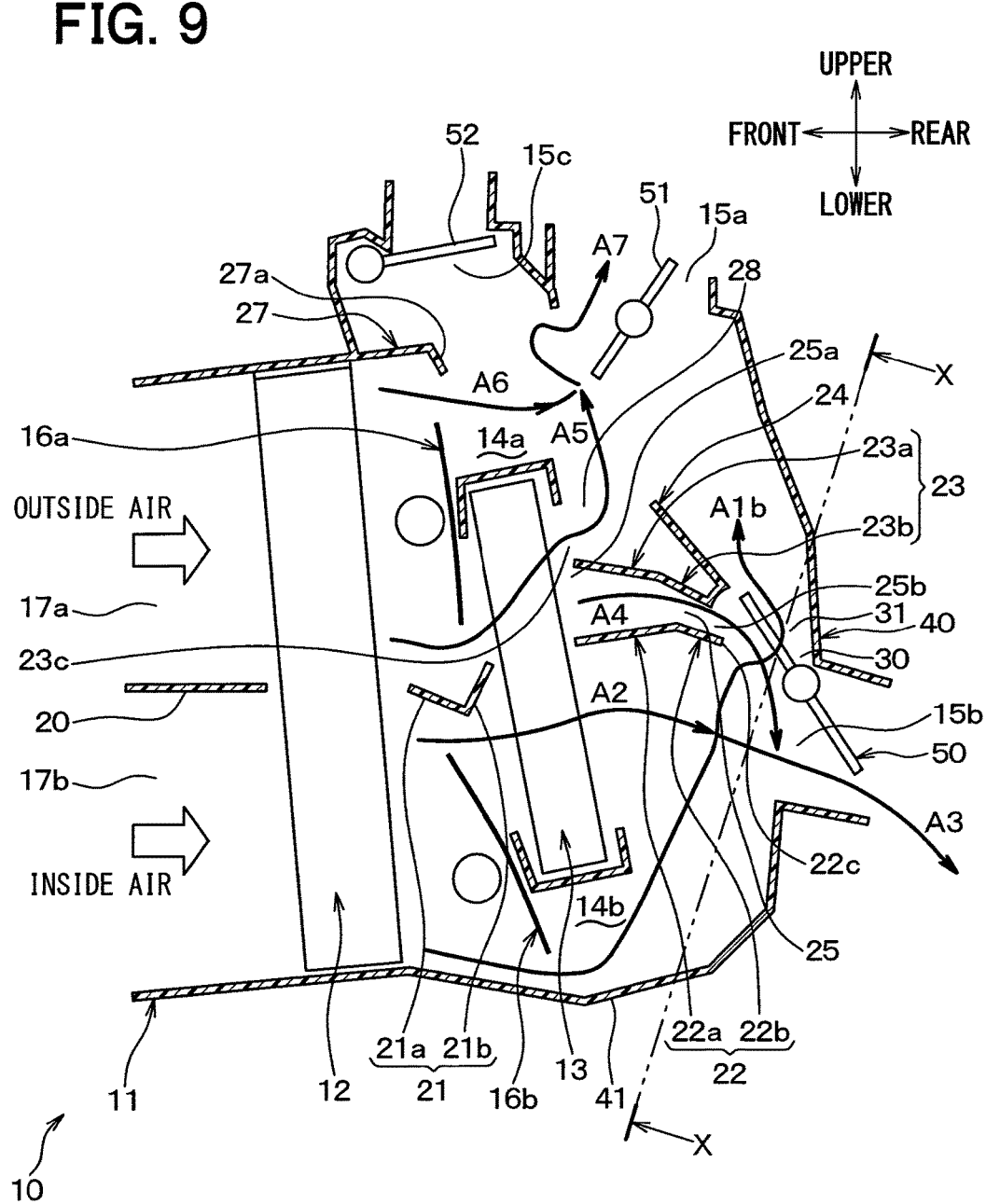
FIG. 9 is a cross-sectional view illustrating an air conditioning unit in an air conditioning unit for a vehicle in a bi-level mode according to a second embodiment.
Figure 10:
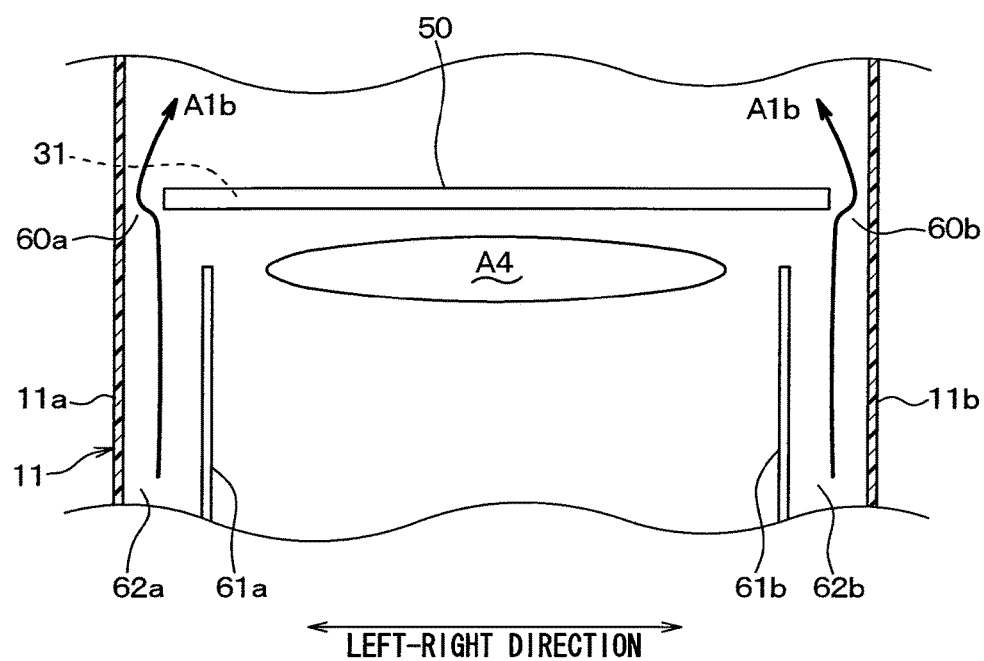
FIG. 10 is a cross-sectional view taken along a line X-X in FIG. 9.

FIG. 9 is a cross-sectional view illustrating an air conditioning unit 10 of the second embodiment. FIG. 10 is a cross-sectional view taken along a line X-X in FIG. 9.

The air conditioning unit 10 of this embodiment is provided with cool air bypass passages 60a, 60b and guide plates 61a, 61b. The cool air bypass passages 60a, 60b are passages that guide the cool air passing through the bypass passage 14b to bypass the mode door 50 and flow upward in the state that the mode door 50 closes the opening 31.

The cool air bypass passage 60a is constructed between a right wall 11a and the mode door 50. The cool air bypass passage 60b is constructed between a left wall 11b and the mode door 50. The right wall 11a forms a right-side wall of a casing 11. A left wall 11b forms a left-side wall of the casing 11.

As shown in FIG. 10, the guide plates 61a, 61b are arranged on the upstream side of the mode door 50 in the casing 11. The guide plate 61a is arranged on the right side on the inside of the casing 11 and forms a cool air passage 62a between the guide plate 61a and the right wall 11a. The cool air passage 62a introduces some of the cool air blown from an evaporator 12 into the cool air bypass passage 60a. The guide plate 61b is arranged on the left side on the inside of the casing 11 and forms a cool air passage 62b between the guide plate 61b and the left wall 11b. The cool air passage 62b introduces some of the cool air blown from the evaporator 12 into the cool air bypass passage 60b.

In this embodiment, in the bi-level mode, some of the cool air blown from the evaporator 12 passes through the bypass passage 14b and the cool air passage 62a, is then guided by a guide plate 24 and a rear wall 40, and flows into a face opening 15a in the state that the mode door 50 closes the opening 31. Furthermore, the cool air, which flows from the evaporator 12 and passes through the bypass passage 14b and the cool air passage 62b, is guided by the guide plate 24 and the rear wall 40 to flow into the face opening 15c.

According to the above-described present embodiment, in the bi-level mode, the cool air blown from the evaporator 12 can flow toward the face opening 15a through the cool air passages 62a, 62b in the state that the mode door 50 closes the opening 31. Thus, a temperature of the air that is blown from the face opening 15a can be lowered. In this way, the temperature difference in the bi-level mode and the temperature difference in the foot mode can be increased. The temperature difference is the temperature difference between the temperature of the air blown from the face opening 15a and the temperature of the air blown from a foot opening 15b.

Third Embodiment

In the above first embodiment, the description has been made on the example in which the opening-end forming portion 26 is formed such that the clearance between the opening-end forming portion 26 and the mode door 50 (i.e., the door body 50a) remains constant even when the position of the mode door 50 is changed in the state that the mode door 50 closes the opening 31. In this third embodiment, a clearance between an opening-end forming portion 26 and a mode door 50 varies depending on a stop position of the mode door 50. More specifically, in this embodiment, in the case where stop positions at which a door body 50a is stopped are set between a first end 26a and a second end 26b of the opening-end forming portion 26, the clearance between the door body 50a and the opening-end forming portion 26 varies from one stop position to another.

Figure 11:
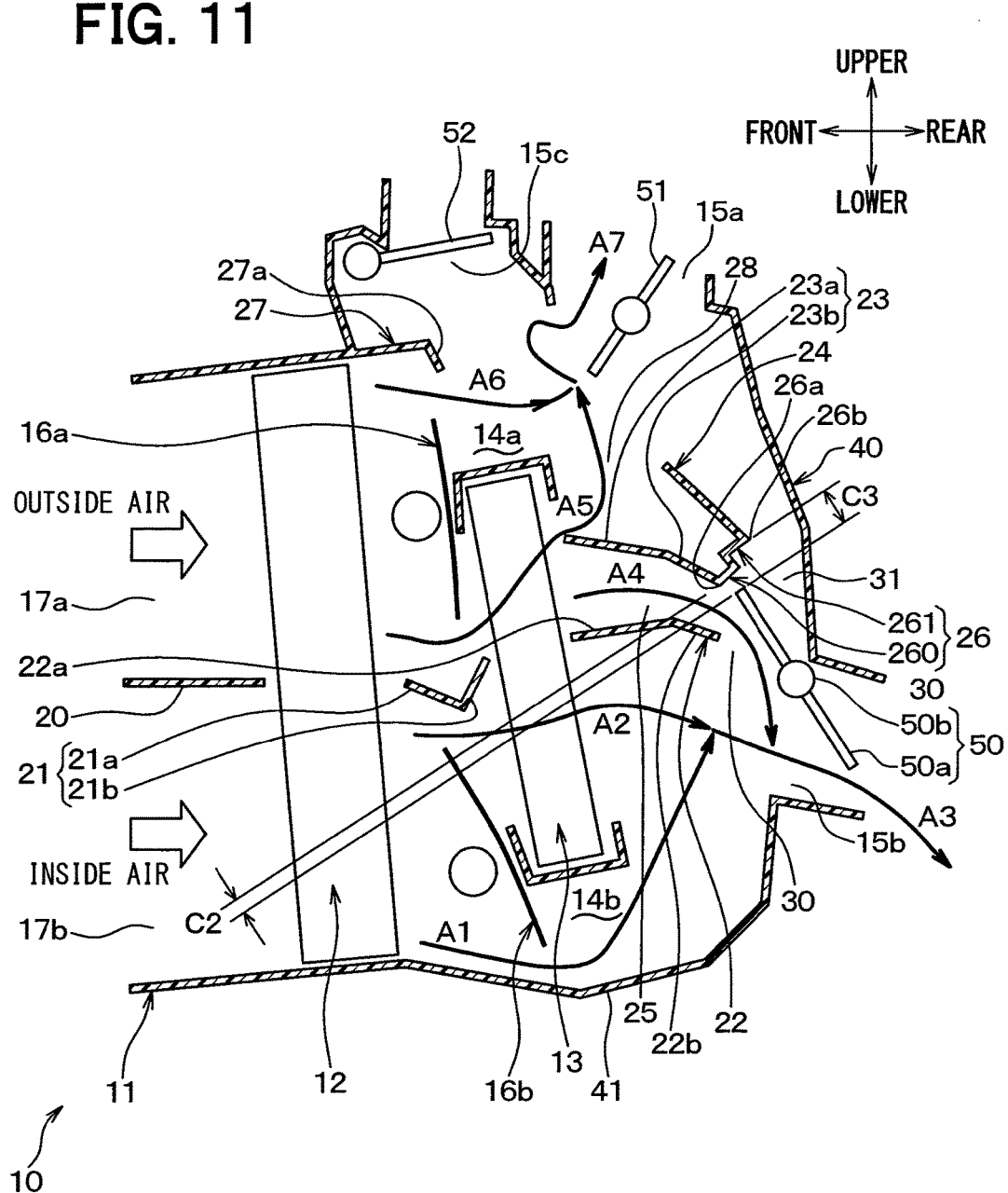
FIG. 11 is a cross-sectional view illustrating an air conditioning unit in an air conditioning unit for a vehicle in a bi-level mode according to a third embodiment.

FIG. 11 is a cross-sectional view illustrating an air conditioning unit 10 in this embodiment and depicts the bi-level mode.

A shape of the opening-end forming portion 26 differs between the air conditioning unit 10 of this embodiment and the air conditioning unit 10 of the above first embodiment. The opening-end forming portion 26 of this embodiment includes step portions 260, 261. The step portion 260 is connected to a partition plate 23, and the step portion 261 is connected to a guide plate 24.

As shown in FIG. 11, clearance C2 between the step portion 260 and the door body 50a is smaller than clearance C3 between the step portion 261 and the door body 50a.

The configuration other than the opening-end forming portion 26 is common among this embodiment and the above first embodiment, and thus the description thereon will not be made.

In this embodiment, in a first bi-level mode, the mode door 50 closes an opening 31 in a state that the door body 50a of the mode door 50 opposes the step portion 260 of the opening-end forming portion 26. In a second bi-level mode, the mode door 50 closes the opening 31 in a state that the door body 50a of the mode door 50 opposes the step portion 261 of the opening-end forming portion 26.

According to the above-described present embodiment, the opening-end forming portion 26 includes the step portions 260, 261. The mode door 50 has the first and second stop positions that respectively correspond to the step portions 260, 261. In addition, the clearance C3 in the second bi-level mode is larger than the clearance C2 in the first bi-level mode. Accordingly, in the second bi-level mode, the volume of the warm air that flows out from a warm air passage 25 and passes between the opening-end forming portion 26 and the mode door 50 is increased in comparison with that in the first bi-level mode.

Thus, in the second bi-level mode, the volume of the warm air that flows into a foot opening 15b can be reduced by increasing the volume of the warm air that flows out from the warm air passage 25 and flows into a face opening 15a through the opening-end forming portion 26 in comparison with that in the first bi-level mode. In this way, the temperature difference can be changed between the first bi-level mode and the second bi-level mode. The temperature difference is the temperature difference between the temperature of the air blown from the face opening 15a and the temperature of the air blown from the foot opening 15b.

Fourth Embodiment

In this fourth embodiment, a new partition plate is arranged between a partition plate 22 and a partition plate 23 in the above embodiment.

Figure 12:
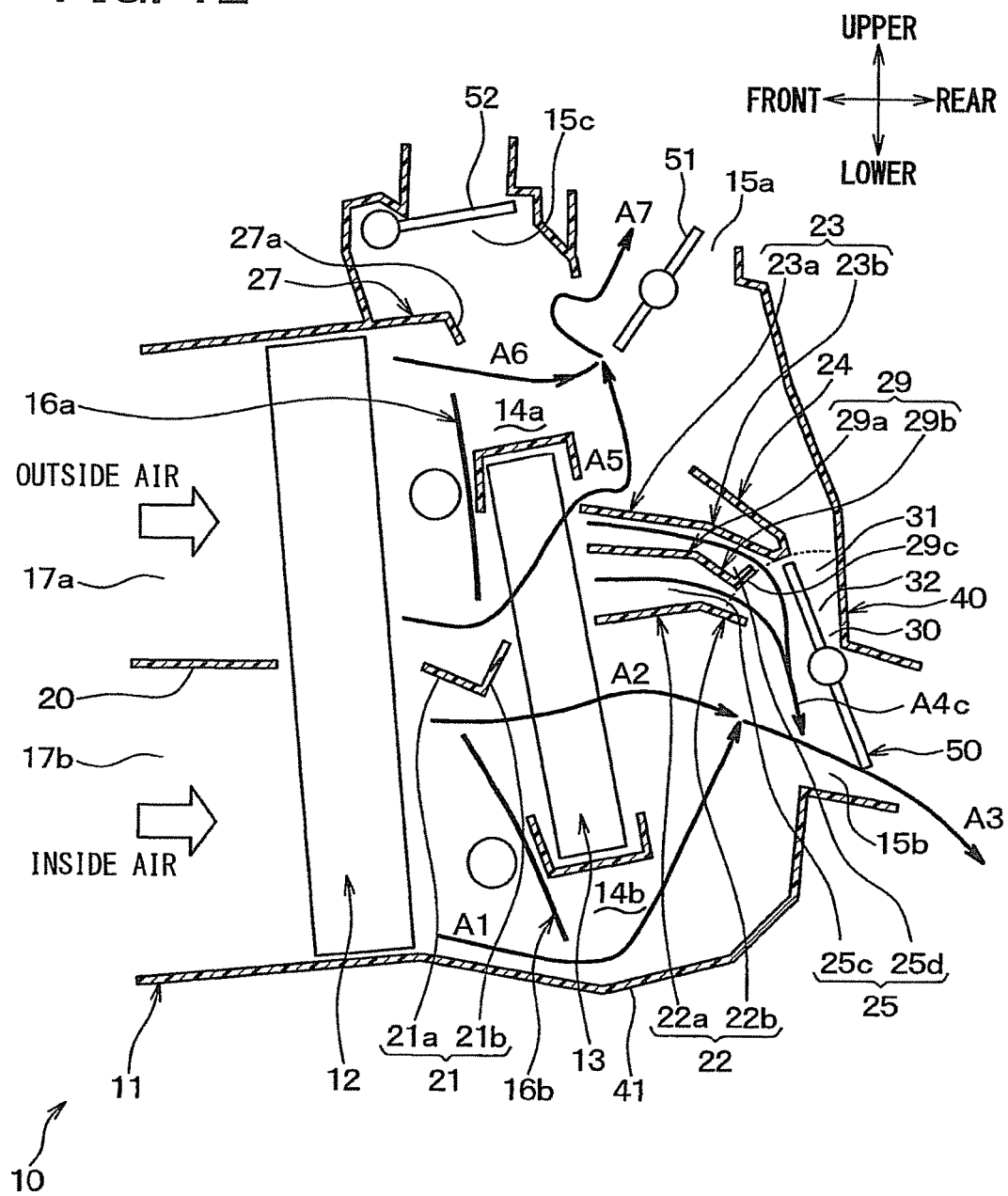
FIG. 12 is a cross-sectional view illustrating an air conditioning unit in an air conditioning unit for a vehicle in a first bi-level mode according to a fourth embodiment.

FIG. 12 is a cross-sectional view illustrating an air conditioning unit 10 of the fourth embodiment.

In the air conditioning unit 10 of this embodiment, a partition plate 29 (i.e., a third partition plate) is added to the air conditioning unit 10 in FIG. 1. The partition plate 29 is a double-layered partition plate for forming an opening (i.e., a third opening) 32 between the partition plate 29 and a rear wall 40. The partition plate 29 is formed in a plate shape that is arranged between the partition plate 22 and the partition plate 23 and expands in the right-left direction. A lower warm-air passage (i.e., a lower passage) 25c through which the warm air blown from a heater core 13 flows into a foot opening 15b is formed between the partition plate 29 and the partition plate 22. An upper warm-air passage (i.e., an upper passage) 25d through which the warm air blown from the heater core 13 flows into the foot opening 15b is formed between the partition plate 29 and the partition plate 23. In other words, the partition plate 29 is arranged between the partition plate 22 and the partition plate 23 and vertically partitions a warm air passage 25 into the lower passage 25c and the upper passage 25d.

More specifically, the partition plate 29 includes plate sections 29a, 29b. The plate section 29a is inclined downward as advancing to the rear side. The plate section 29b is arranged on a rear side of the plate section 29a. The plate section 29b is inclined downward as advancing to the rear side. An inclination angle of the plate section 29b is larger than an inclination angle of the plate section 29a. The inclination angle refers to an angle that is defined by each of the plate sections 29a, 29b in the clockwise direction with respect to the front-rear direction.

A projection 29c is arranged on the rear side of the plate section 29b and is projected toward the partition plate 23. The projection 29c constitutes an opening forming section for forming the opening 32 and narrows an air outlet of the upper warm-air passage 25d between the partition plate 23 and the partition plate 29. Accordingly, a warm air inlet is larger than a warm air outlet in the upper warm-air passage 25d. Furthermore, a warm air inlet is larger than a warm air outlet in the lower warm-air passage 25c between the partition plate 22 and the partition plate 29.

Figure 13:
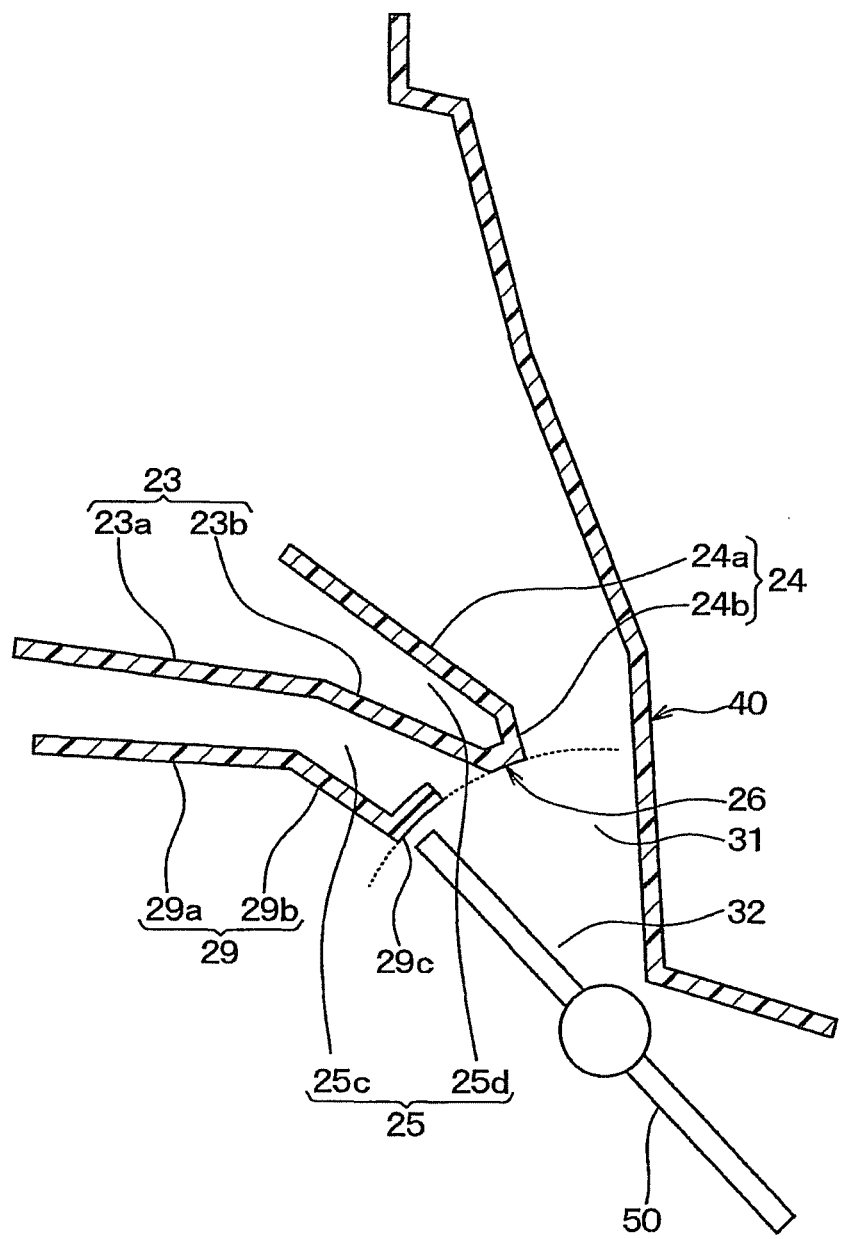
FIG. 13 is a cross-sectional view illustrating a periphery of a partitioning plate and a guide plate of the air conditioning unit in the fourth embodiment.

As shown in FIG. 13, a guide plate 24 of this embodiment includes plate sections 24a, 24b. The plate section 24a is inclined upward from the opening 31 side to the front side. The plate section 24b is inclined upward from the opening 31 side to the front side. An inclination angle of the plate section 24b is larger than an inclination angle of the plate section 24a. The inclination angle refers to an angle that is defined by each of the plate sections 24a, 24b in the clockwise direction with respect to the front-rear direction.

A mode door 50 of this embodiment opens or closes each of openings 30, 31, 32 and the foot opening 15b.

In this embodiment, in a third bi-level mode shown in FIG. 12, the mode door 50 closes the opening 31 and opens the openings 30, 32 and the foot opening 15b. In this case, the warm air passing through the upper warm-air passage 25d is guided by the partition plate 23 and the mode door 50 and flows into the foot opening 15b. The warm air flowing out of the heater core 13 and passing through the lower warm-air passage 25c is guided by the partition plate 29 and the mode door 50 and flows into the foot opening 15b. The warm air from the lower warm-air passage 25c and the warm air from the upper warm-air passage 25d flow into the foot opening 15b.

Figure 14:
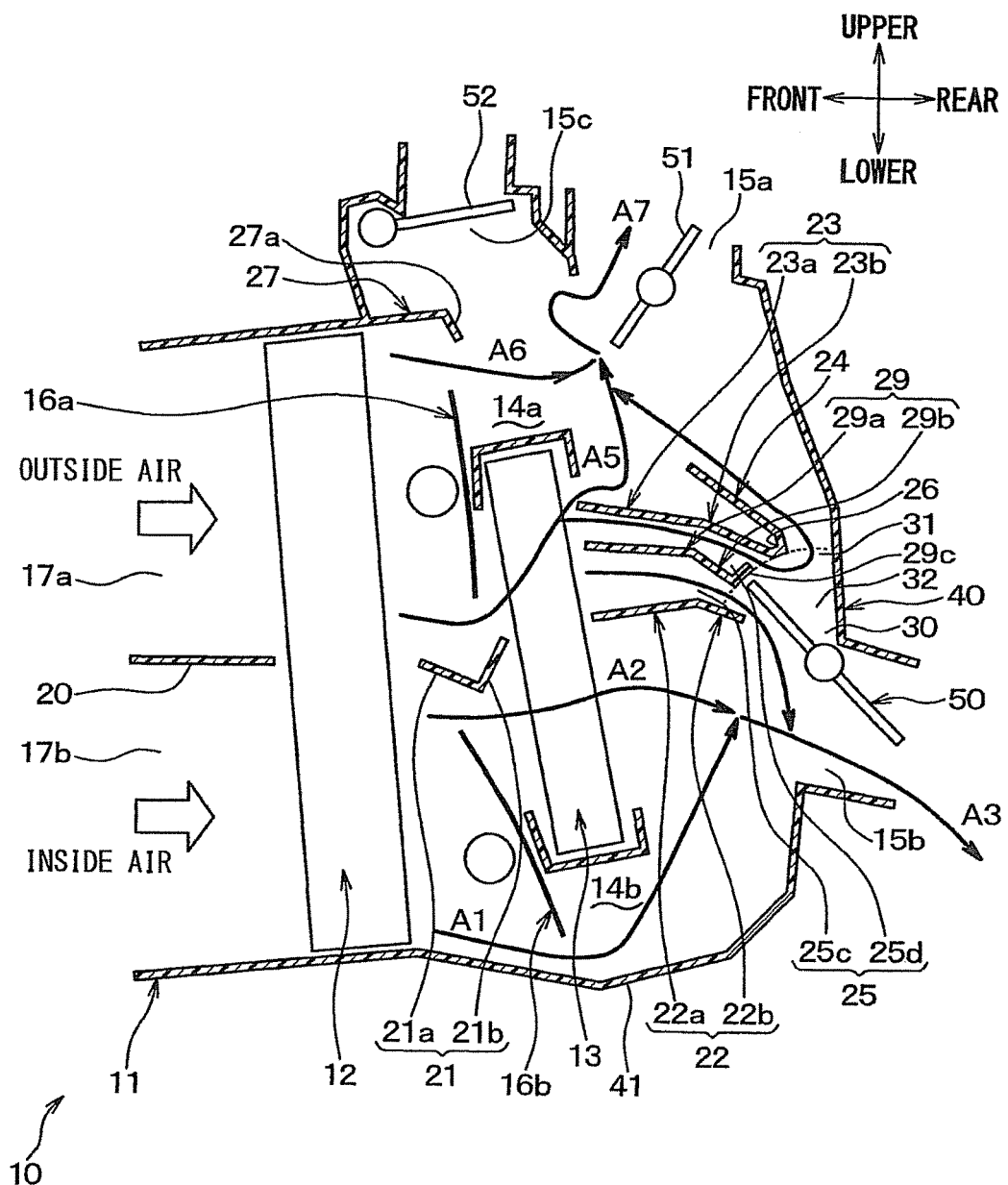
FIG. 14 is a cross-sectional view illustrating the air conditioning unit in a second bi-level mode according to the fourth embodiment.

In a fourth bi-level mode shown in FIG. 14, the mode door 50 closes the opening 32 and opens the openings 30, 31 and the foot opening 15b. In this case, the warm air flowing out of the heater core 13 and passing through the upper warm-air passage 25d is guided by the rear wall 40 and the guide plate 24 and flows toward a face opening 15a.

Meanwhile, the warm air flowing out of the heater core 13 and passing through the lower warm-air passage 25c is guided by the partition plate 29 and the mode door 50 and flows into the foot opening 15b.

According to the above-described present embodiment, the partition plate 29 is arranged between the partition plate 22 and the partition plate 23. Thus, the temperature difference can be changed between the third bi-level mode in which the mode door 50 closes the opening 31 and the fourth bi-level mode in which the mode door 50 closes the opening 32. The temperature difference is the temperature difference between the temperature of the air blown from the face opening 15a and the temperature of the air blown from the foot opening 15b.

Fifth Embodiment

In the above first to fourth embodiments, the openings 30, 31 and the foot opening 15b are opened or closed by the single mode door 50. In this fifth embodiment, openings 30, 31 and a foot opening 15b are opened or closed by different doors, respectively.

Figure 15:
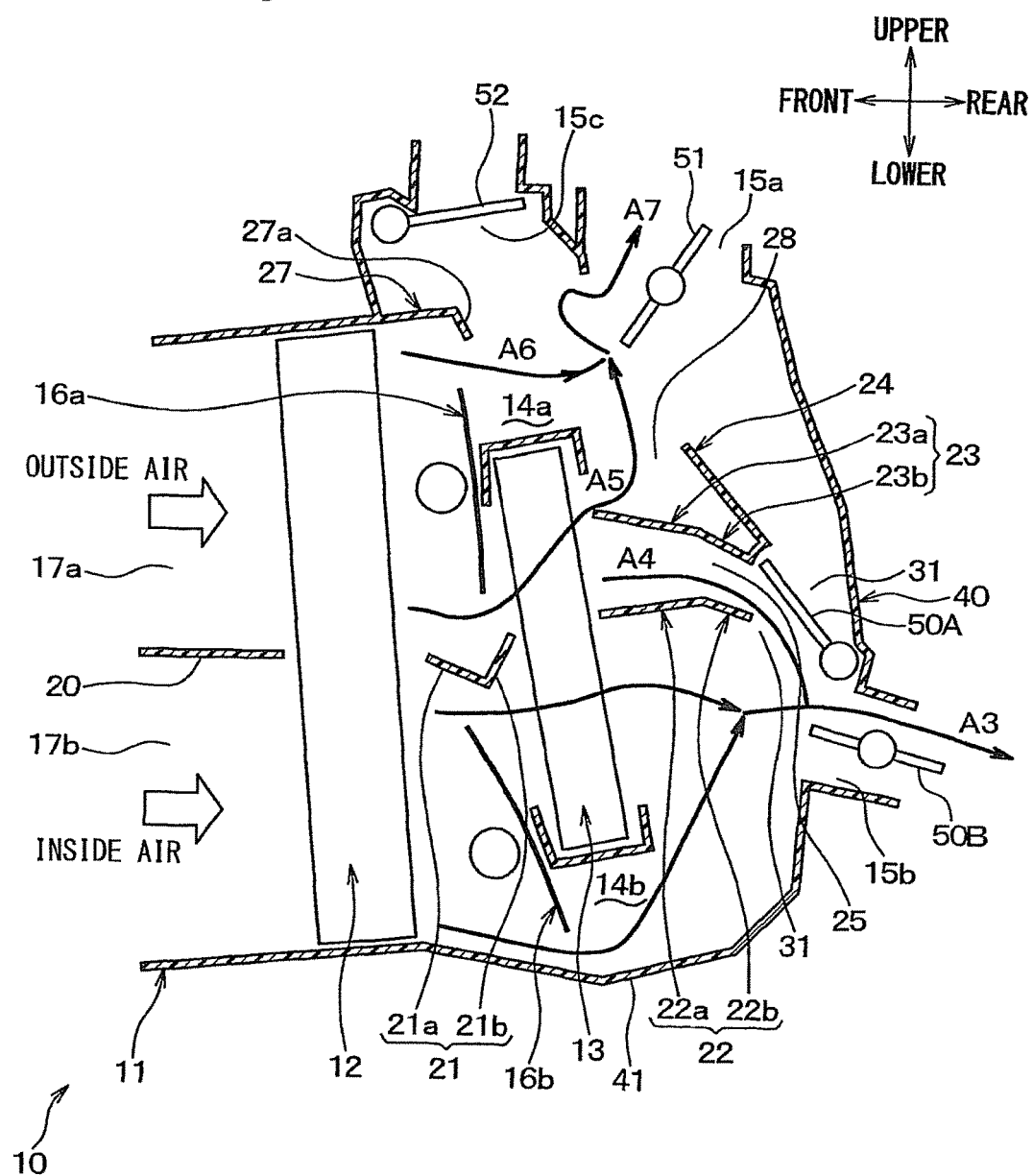
FIG. 15 is a cross-sectional view illustrating an air conditioning unit in an air conditioning unit for a vehicle in a bi-level mode according to a fifth embodiment.

FIG. 15 is a cross-sectional view illustrating an air conditioning unit 10 of the fifth embodiment.

In the air conditioning unit 10 of this embodiment, mode doors 50A, 50B are provided instead of the mode door 50 in FIG. 1. The mode door 50A opens one of the openings 30, 31 and closes the other. The mode door 50B opens or closes the foot opening 15b. The mode door 50A is a so-called "cantilevered door", and the mode door 50B is a so-called "butterfly door".

It should be noted that the configuration other than the mode doors 50A, 50B of the air conditioning unit 10 of this embodiment is the same as that in the above first embodiment. Thus, the description thereon will not be made.

Other Embodiments

In the fourth embodiment, the one partition plate 29 is used as the third partition plate in the air conditioning unit 10. However, two or more of the partition plates 29 may be used.

In the first to fourth embodiments, the examples in which the plate doors are used as the mode doors 50, 51, 52 are described. However, various types of doors, such as a rotary door and a slide door, may be used.

In the first to fourth embodiments, as the blower unit, either one of the outside air and the inside air is blown into the outside air passage of the air conditioning unit 10, and the inside air is blown into the inside air passage of the air conditioning unit 10. However, a blower unit for blowing the outside air or the inside air into the air conditioning unit 10 without distinguishing the outside air passage and the inside air passage may be used.

What is claimed is:

1. An air conditioning unit for a vehicle comprising:
   a casing having a face opening and a foot opening provided below the face opening in an upper-lower direction, the casing is formed with a passage through which air flows toward the face opening and the foot opening;
   a heating heat exchanger that is arranged in the casing and heats the air;
   a first partition plate that is located below the face opening and partitions a downstream side of the heating heat exchanger in an airflow direction into a first passage and a second passage located below the first passage;
   a first opening that is formed on a downstream side of the first partition plate in an airflow direction and communicates between the first passage and the second passage;
   a second partition plate that is arranged above the first partition plate on the downstream side of the heating heat exchanger and is formed with a third passage between the first partition plate and the second partition plate in the first passage;
   a second opening that is located on a downstream side of the second partition plate in an airflow direction and communicates between an upper side and a lower side of the second partition plate; and
   a switching door that opens or closes the first and second openings, wherein the foot opening is located below an opening forming section of the first partition plate that forms the first opening, the air in the third passage flows toward the face opening in a first air conditioning mode in which the switching door closes the first opening and opens the second opening, the air in the third passage is guided toward the foot opening by the second partition plate and the switching door in a second air conditioning mode in which the switching door opens the first opening and closes the second opening, and the switching door closes one of the first and second openings and the foot opening, and opens the remaining two of the first and second openings and the foot opening.

2. The air conditioning unit for a vehicle according to claim 1, wherein the second partition plate is formed such that a cross-sectional area of the third passage is reduced as the second partition plate extends from the heating heat exchanger.

3. The air conditioning unit for a vehicle according to claim 1, wherein the second partition plate approaches the foot opening as the second partition plate extends from the heating heat exchanger.

4. The air conditioning unit for a vehicle according to claim 1, wherein the heating heat exchanger has an air outflow surface on the downstream side, and a distance between the first partition plate and the second partition plate is longer than a distance between an upper end of the air outflow surface and the second partition plate.

5. The air conditioning unit for a vehicle according to claim 1, further comprising:

a guide plate on an upper side of the second partition plate in the casing; and an opening-end forming portion is provided between an end on the second opening side of the second partition plate and the guide plate, wherein the switching door includes:
a door body that is formed in a plate shape; and
a shaft that is provided in the door body and supports the switching door to be freely rotatable with respect to the casing, the door body rotates around the shaft and opens or closes the first and second openings, and the door body rotates to move between a first end on the second partition plate side and a second end on the guide plate side of the opening-end forming portion.

6. The air conditioning unit for a vehicle according to claim 5, wherein when the door body rotates between the first end and the second end of the opening-end forming portion, a clearance between the door body and the opening-end forming portion is fixed.

7. The air conditioning unit for a vehicle according to claim 5, wherein a plurality of stop positions at which the door body is stopped are set between the first end and the second end of the opening-end forming portion, and the opening-end forming portion is formed such that a clearance between the door body and the opening-end forming portion varies from one of the plurality of stop positions to another one of the plurality of stop positions.

8. The air conditioning unit for a vehicle according to claim 7, wherein the opening-end forming portion includes a plurality of step portions that respectively correspond to the plurality of stop positions and form a clearance between the door body such that the clearance varies from one of the plurality of stop positions to another one of the plurality of stop positions.

9. The air conditioning unit for a vehicle according to claim 1, further comprising:

a third partition plate that is arranged between the first partition plate and the second partition plate and vertically partitions the third passage into an upper passage and a lower passage; and a third opening that is formed on a downstream side of the third partition plate in an airflow direction in the casing and communicates between the lower passage and the upper passage, wherein the switching door opens or closes the first, second, and third openings, the air that flows through the upper passage flows toward the face opening when the switching door closes the third opening and opens the first and second openings, and the air that flows through the lower passage is guided by the first partition plate and the switching door and flows toward the foot opening, and when the switching door closes the second opening and opens the first and third openings, the air that flows through the lower passage is guided toward the foot opening by the third partition plate and the switching door, and the air that flows through the upper passage is guided toward the foot opening by the second partition plate and the switching door.

10. The air conditioning unit for a vehicle according to claim 1, further comprising:

a first bypass passage that is provided above the heating heat exchanger in the casing and through which the air bypasses the heating heat exchanger and flows into the face opening;

a first air-mix door that changes a ratio of an air volume passing through an upper side of the first partition plate and an air volume passing through the first bypass passage of the heating heat exchanger;

a second bypass passage that is provided below the heating heat exchanger in the casing and through which the air bypasses the heating heat exchanger and flows into the foot opening; and a second air-mix door that changes a ratio of an air volume passing through a lower side of the first partition plate and an air volume passing through the second bypass passage of the heating heat exchanger.

11. The air conditioning unit for a vehicle according to claim 10, further comprising a cooling heat exchanger that is arranged on an upstream side of the heating heat exchanger in the airflow direction in the casing and cools the air.

12. The air conditioning unit for a vehicle according to claim 11, further comprising third bypass passages through which the air bypasses the switching door and flows from the second bypass passage toward the face opening when the switching door opens the first opening and closes the second opening.

* * * * *